United States Patent
Yang

(10) Patent No.: US 10,642,393 B2
(45) Date of Patent: May 5, 2020

(54) TOUCH DEVICE AND TOUCH DISPLAY SYSTEM FOR ELIMINATING NOISE IN PANEL DEVICE

(71) Applicant: Shenzhen Goodix Technology Co., Ltd., Shenzhen, Guangdong (CN)

(72) Inventor: Meng-Ta Yang, Taipei (TW)

(73) Assignee: Shenzhen Goodix Technology Co., Ltd., Shenzhen, Guangdong (CN)

( * ) Notice: Subject to any disclaimer, the term of this patent is extended or adjusted under 35 U.S.C. 154(b) by 17 days.

(21) Appl. No.: 15/973,546

(22) Filed: May 8, 2018

(65) Prior Publication Data

US 2018/0253177 A1 Sep. 6, 2018

Related U.S. Application Data

(63) Continuation of application No. PCT/CN2016/113312, filed on Dec. 30, 2016.

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01); *G06F 3/0418* (2013.01); *G06F 2203/04103* (2013.01)

(58) Field of Classification Search
CPC .................................................... G06F 3/0412
USPC ....................................................... 345/173
See application file for complete search history.

(56) References Cited

U.S. PATENT DOCUMENTS

| | | | |
|---|---|---|---|
| 2008/0048994 A1 | 2/2008 | Lee | |
| 2012/0081320 A1* | 4/2012 | Hwang | G06F 3/0418 345/173 |
| 2013/0241858 A1 | 9/2013 | Hung | |
| 2014/0168149 A1* | 6/2014 | Han | G06F 3/0412 345/174 |
| 2015/0035768 A1 | 2/2015 | Shahparnia | |
| 2015/0268778 A1* | 9/2015 | Okamura | G06F 3/0412 345/173 |
| 2016/0179255 A1 | 6/2016 | Yang | |
| 2018/0136778 A1 | 5/2018 | Choi | |

FOREIGN PATENT DOCUMENTS

| | | |
|---|---|---|
| CN | 103135851 A | 6/2013 |
| CN | 105335009 A | 2/2016 |
| CN | 105335010 A | 2/2016 |
| CN | 105353920 A | 2/2016 |
| KR | 10-2016-0144720 A | 12/2016 |
| WO | 2016/195388 A1 | 12/2016 |

* cited by examiner

*Primary Examiner* — Long D Pham
(74) *Attorney, Agent, or Firm* — Winston Hsu

(57) ABSTRACT

The present application provides a touch device, including a touch circuit, connected to a panel device and generating a signal according to a touch on the panel device by an external object, wherein the touch circuit takes a reference signal provided by the panel device as a signal source of a ground terminal; a power supply circuit, connected to the touch circuit, for providing power for the touch circuit; and a host system, connected to the touch circuit, for receiving the signal from the touch circuit. The touch display system provided by the present application has advantages of capable of eliminating the noises from the panel device and improving the signal quality of the touch circuit.

10 Claims, 4 Drawing Sheets

TOUCH DEVICE AND TOUCH DISPLAY SYSTEM FOR ELIMINATING NOISE IN PANEL DEVICE

CROSS REFERENCE TO RELATED APPLICATIONS

The present application is a continuation of international application No. PCT/CN2016/113312, filed on Dec. 30, 2016, which is incorporated herein by reference in its entirety.

FIELD OF THE INVENTION

The present application relates to a touch device and touch display system, and more particularly, to a touch device capable of eliminating internal noise of a touch circuit of the touch display system and a touch display system adopting the touch device.

BACKGROUND

With the advantage and development of technology, mobile phones, digital cameras, tablet computers, laptops and mobile electronic devices have become indispensable tools to human life. In order to achieve a more efficient working way, touch devices have been utilized in all kinds of electronic devices, for example, inductive and capacitive touch devices, touch panels and so on. However, since the conventional touch device is often connected to the liquid-crystal display (LCD) panel driven by a high voltage, when a driving circuit drives the LCD panel, interferences or noises are generated, which affects quality of a received signal scanned by a touch circuit of the touch device.

Therefore, how to provide a touch display system capable of eliminating the noises from the LCD panel device, and improving the signal quality of the touch display system, has become one of objectives in the industry.

SUMMARY

Therefore, one major objective of the present disclosure is to provide a touch display system capable of eliminating the noises from the panel device and improving the quality of the touch signal.

To solve the above mentioned technical problems, an embodiment of the present application provides a touch device, including a touch circuit which is connected a panel device and configured to generate a signal according to a touch on the panel device by an external object, and the touch circuit is configured to receive a reference signal provided by the panel device as a signal source of a ground terminal of the touch circuit; a power supply circuit, connected to the touch circuit, is configured to provide power for the touch circuit; and a host system, connected to the touch circuit, is configured to receive the signal generated by the touch circuit.

Optionally, the reference signal is generated by a common electrode layer of a sub-pixel of the panel device, when the panel device is driven by a direct current or an alternate current.

Optionally, the touch circuit has a first working voltage, the host system has a second working voltage, when the first working voltage is higher than the second working voltage, and the power supply circuit is configured to provide power for the touch circuit.

Optionally, when the second working voltage is higher than the first working voltage, the host system is configured to provide power for the touch circuit.

Optionally, the power supply circuit further includes a level shifter configured to convert a level of a communication signal between the touch circuit and the host system.

Optionally, the reference signal is a floating signal.

To better solve the above mentioned technical problems, an embodiment of the present application provides a touch display system includes a panel device and a touch device, wherein the touch device includes a touch circuit, the touch circuit is connected to the panel device and configured to generate a signal according to a touch on the panel device by an external object, and the touch circuit is configured to receive a reference signal provided by the panel device as a signal source of a ground terminal of the touch circuit; a power supply circuit, connected to the touch circuit, is configured to provide power for the touch circuit; and a host system, connected to the touch circuit, is configured to receive the signal generated by the touch circuit.

The touch display system provided by the present application takes the reference signal of the panel device as the ground signal of the touch circuit, and the power supply circuit provides power for the touch circuit, so as to eliminate the noises from the panel device and improve the signal quality of the touch display system.

These and other objectives of the present disclosure will no doubt become obvious to those of ordinary skill in the art after reading the following detailed description of the preferred embodiment that is illustrated in the various figures and drawings.

BRIEF DESCRIPTION OF THE DRAWINGS

One or more exemplary embodiments are illustrated by the drawings corresponding to figures, these illustrative embodiments do not constitute limitations to the embodiments, the elements denoted by the same reference numerals in the figures are similar elements, and unless specific statement, the figures do not constitute scale limitations.

DETAILED DESCRIPTION

In order to make the objects, technical solutions and advantages of the present disclosure become more apparent, the following relies on the accompanying drawings and embodiments to describe the present disclosure in further detail. It should be understood that the specific embodiments described herein are only for explaining the present disclosure and are not intended to limit the present disclosure.

Figure 1:
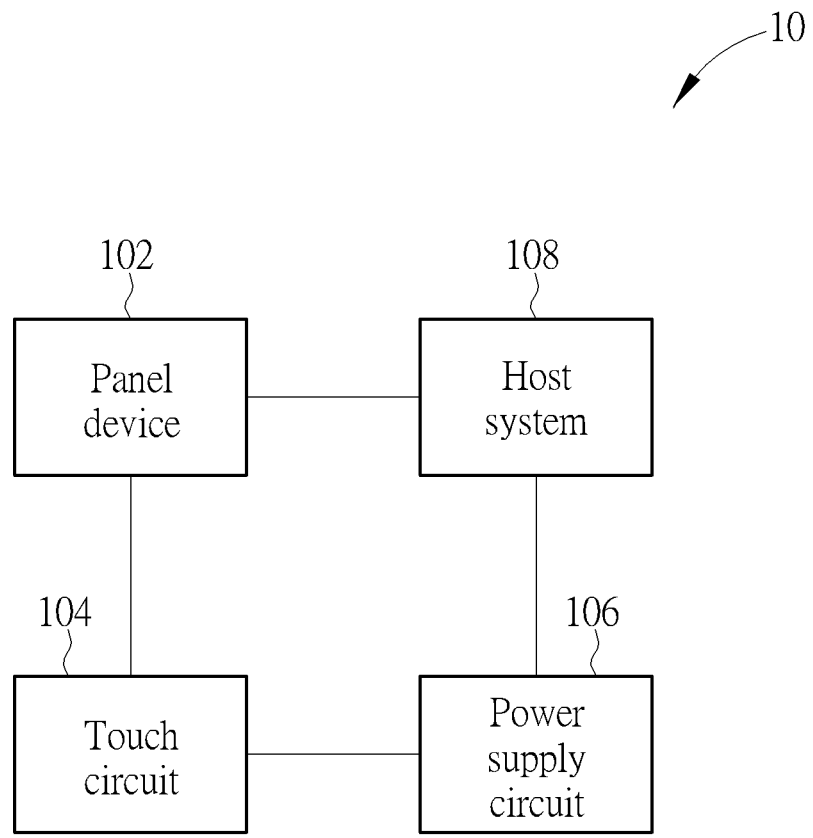
FIG. 1 is a schematic diagram of a touch display system according to an embodiment of the present application.

Please refer to FIG. 1, which is a schematic diagram of a touch display system 10 according to an embodiment of the present application. The touch display system 10 includes a panel device 102 and a touch device (not labeled in the figure) connected to the panel device 102. The touch device includes a touch circuit 104, a power supply circuit 106 and a host system 108. The panel device 102 is utilized for providing a reference signal, for example, the reference signal may be a signal generated when a common voltage (VCOM) layer of a sub-pixel of Indium Tin Oxide (ITO) of the LCD panel is driven by a direct current or an alternate current (e.g. an ACVCOM and DCVCOM LCD panel). The touch circuit 104 is connected to the panel device 102, and the touch circuit 104 takes the reference signal of the panel device 102 as a signal source of a ground terminal of the touch circuit 104. The touch circuit 104 is utilized for generating a signal, e.g., a touch signal when receiving a finger touch, so as to determine a location where an electrode was touched; for example, when the panel device 102 is implemented by the LCD panel and receives the finger touch, the touch circuit of the LCD panel, which includes electrodes, generates a capacitive electrode variation signal, and the touch circuit takes the signal from the VCOM layer of ITO of the LCD panel as the signal source of the ground terminal. The power supply circuit 106 is connected to the touch circuit 104, for providing power for the touch circuit 104, and converting a level of a communication signal between the touch circuit 104 and the host system 108. In addition, the host system 108 is connected to the panel device 102 and the power supply circuit 106; for example, the host system 108 maybe implemented by a mobile phone or a tablet computer, for receiving a signal level from the touch circuit 104, which is converted by the power supply circuit 106, so as to communicate with the touch circuit 104; for example, the touch circuit determines a location where the finger touches on the LCD panel, transmits a location signal to the host system 108 (i.e. the mobile phone or the tablet computer) , and displays an interaction on the panel device.

Figure 2:
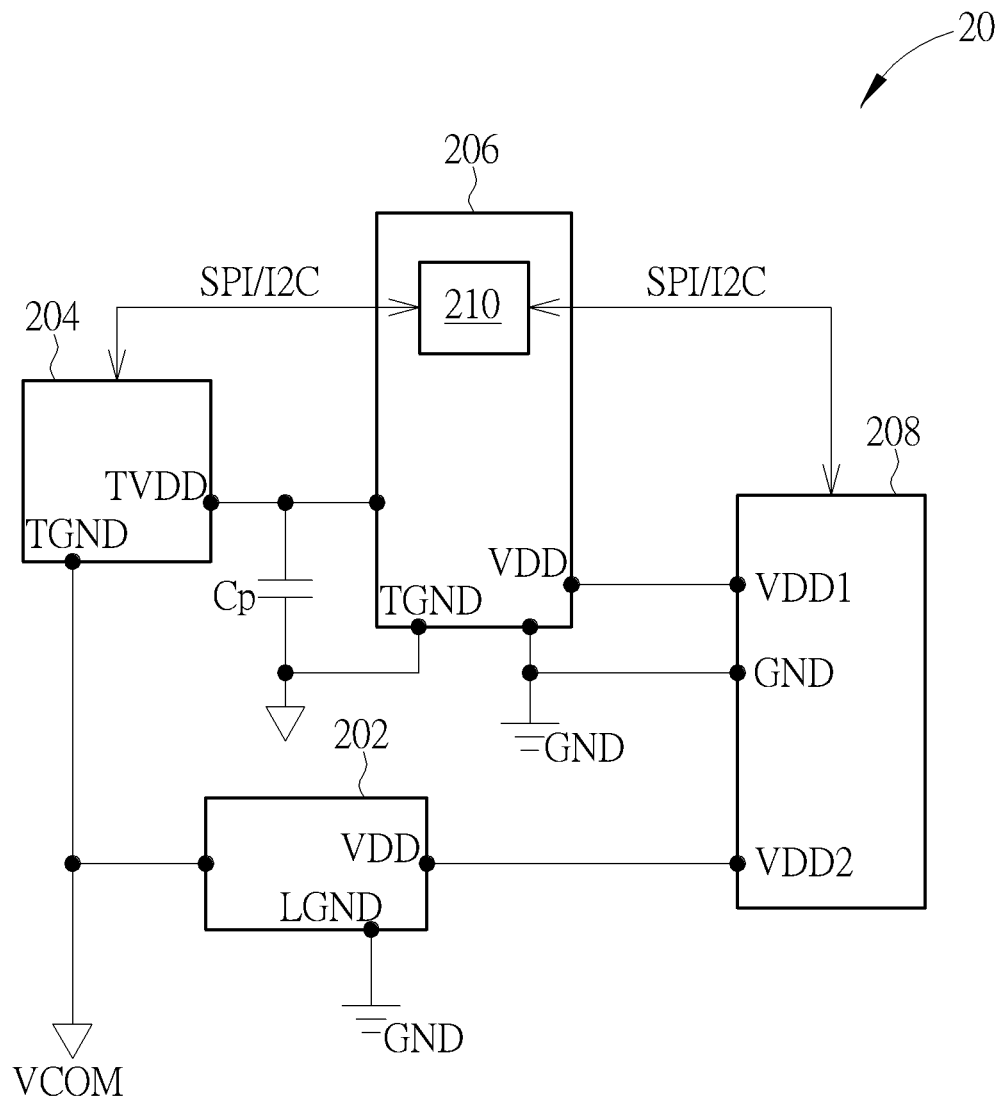
FIG. 2 is a schematic diagram of a circuit structure of a touch display system according to an embodiment of the present application.

Please continue to refer to FIG. 2, which is a schematic diagram of a circuit structure of a touch display system 20 according to an embodiment of the present application. In this embodiment, the circuit structure of the touch display system 20 includes a panel device 202, a touch circuit 204, a power supply circuit 206 and a host system 208. As shown in FIG. 2, the panel device 202 is connected to the touch circuit 204 and the host system 208, for providing a reference signal VCOM for the touch circuit 204. The touch circuit 204 is utilized for generating a signal when the panel device 202 receives a finger touch, so as to determine a location where an electrode was touched, and receive the reference signal VCOM from the panel device 202. The power supply circuit 206 is connected to the touch circuit 204 for providing power for the touch circuit 204, and includes a level shifter 210 for converting a level of a communication signal between the touch circuit 204 and the host system 208. The host system 208 (i.e. a mobile phone or a tablet computer) is connected to the panel device 202 and the touch circuit 204, for providing power source for the panel device 202 and communicating with the touch circuit 204.

In detail, since the VCOM layer of the sub-pixel of the LCD panel generates huge noises or interferences and affects the touch signal, when driven by the DC current or the AC current, the panel device 202 of the embodiment of the present disclosure provides a reference signal VCOM to a ground terminal TGND of the touch circuit 204, such that the ground of the touch circuit 204 is from the reference signal VOCM, which generates the noises, so as to prevent the touch circuit 204 from suffering the noise interferences, which is from the panel device 202 being scanned and caused by the ITO VCOM layer driven by a high voltage, and to improve the received signal quality of the touch circuit 204. In addition, in order to accord the level between the touch circuit 204 and the host system 208, the power supply circuit 206 converts, by a level shifter 210, a level of a communication signal between the touch circuit 204 and the host system 208 transmitted via the Serial Peripheral Interface (SPI) or the Inter Integrated Circuit Communications (I2C) bus. That is, the level shifter 210 converts the communication signal between the touch circuit 204 and the host system 208, such that the level between the touch circuit 204 and the host system 208 is consistent when transmitting the communication signal. Notably, in general, a working voltage TVDD of the touch circuit 204 is lower than a working voltage VDD1 of the host system 208; under this circumstance, the power of the touch circuit 204 is provided by the host system 208. However, since the reference signal VCOM of the ground terminal TGND of the touch circuit 204 is provided by the power supply circuit 206, and the reference signal VCOM is a floating signal, which results in that the working voltage TVDD of the touch circuit 204 may be higher than the working voltage VDD1 of the host system 208 sometimes. In this situation, the host system 208 may not be able to supply stable power for the touch circuit 204. Therefore, in this example, the power supply circuit 206 may stably supply the power for the touch circuit 204 when the working voltage TVDD of the touch circuit 204 is higher than the working voltage VDD1 of the host system 208. In this way, the panel device provides the reference signal and the power supply circuit provides the power for the touch circuit, such that the touch circuit may avoid the noise interferences generated by the panel device and obtain a clearer signal with higher quality.

Figure 3:
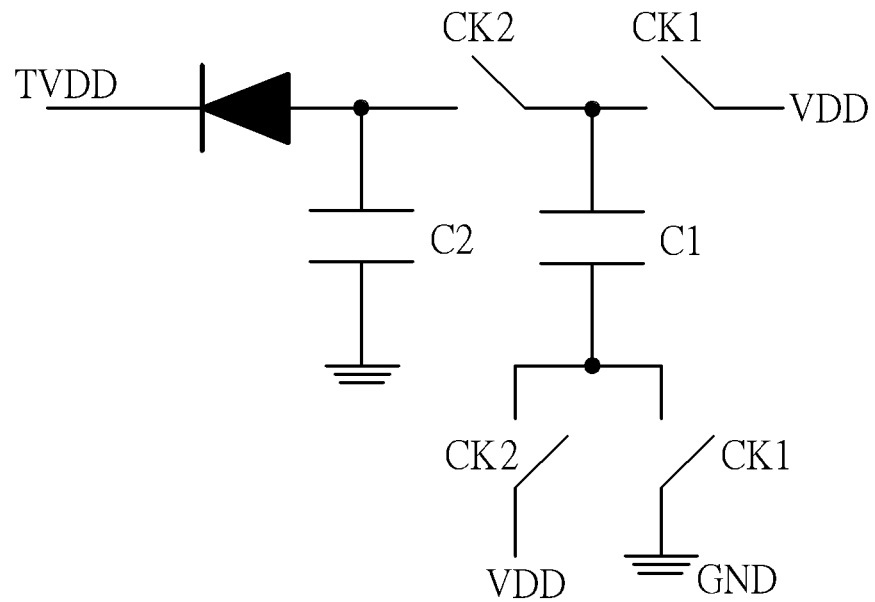
FIG. 3 is a schematic diagram of a power supply circuit according to an embodiment of the present application.
Figure 4:
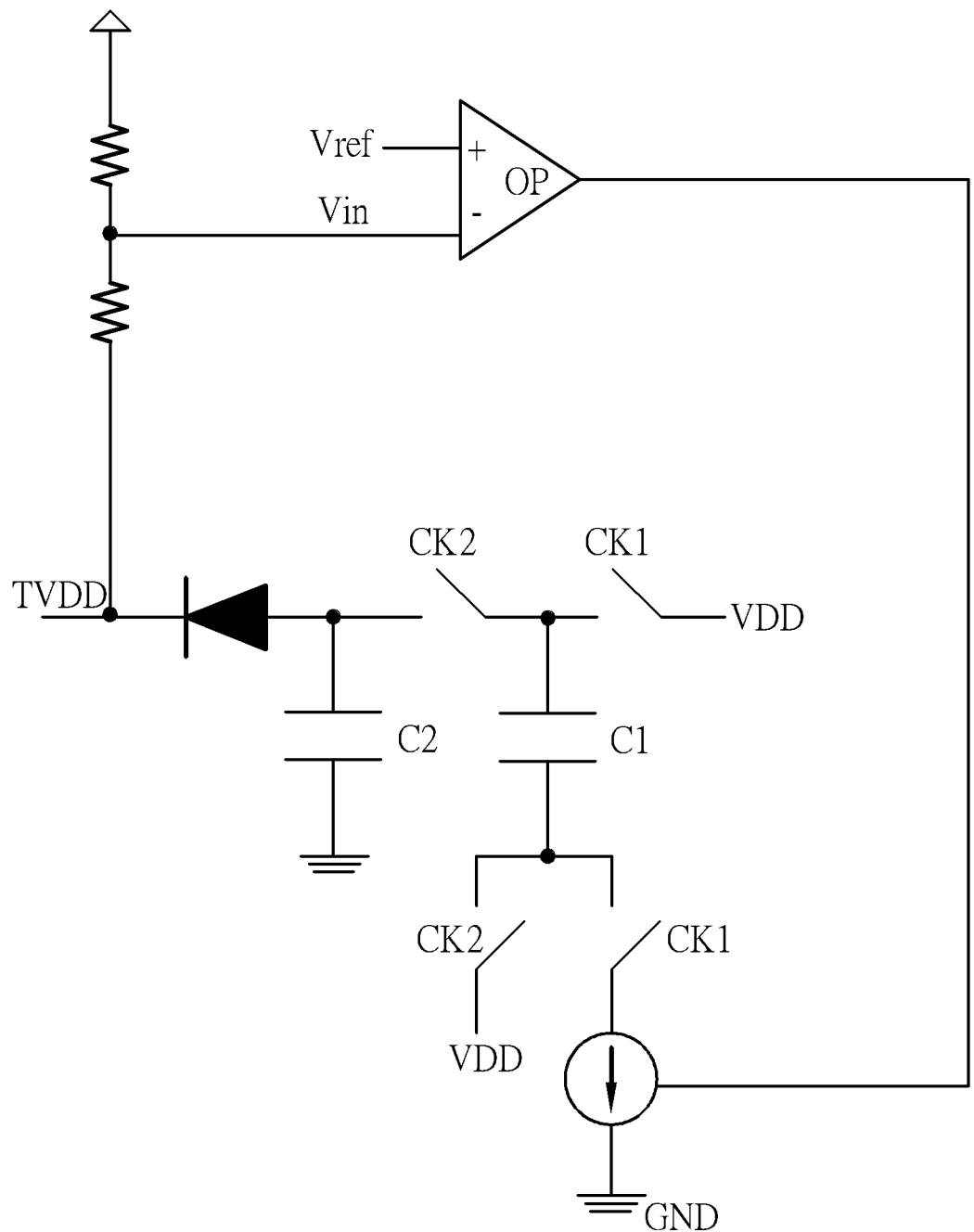
FIG. 4 is a schematic diagram of another power supply circuit according to an embodiment of the present application.

Note that, the embodiments stated above are utilized for illustrating the spirit of the present application, those skilled people in the art may make modifications and alternations, and not limited thereto. For example, the power supply circuit 206 of the present application may be implemented by a charge pump, e.g. please refer to FIG. 3 and FIG. 4, which are the power supply circuit 206 according to embodiments of the present application. As shown in FIG. 3, capacitors C1 and C2 of internal circuit of a capacitive charge pump can be used to store energy, and switches CK1, CK2 are alternatively switched on and switched off to perform a voltage conversion between DC/DC. That is, when the switch CK1 is switched on, the voltage VDD is configured to charge the capacitor C1; when the switch CK1 is switched off and the switch CK2 is switched on, the voltage VDD charges the capacitor C2, such that the capacitive charge pump may be one of the examples for implementing the power supply circuit of the present disclosure. In another embodiment, please refer to FIG. 4, different from FIG. 3, FIG. 4 further adds a non-inverting closed loop operational amplifier as one example of implementing the power supply circuit, and not limited thereto, and all kinds of devices capable of implementing the charge pump are suitable for the present application. In addition, the power supply circuit 206 may provide a high voltage signal for the touch device under a high voltage process, and further improve the SNR of the touch circuit, which belongs to the scope of the present disclosure.

In summary, the embodiments of the present application utilize the reference signal provided by the panel device as the signal source of the ground terminal of the touch circuit, and utilizes the power supply circuit for providing the power to the touch circuit, so as to avoid the effect of the noises caused by the panel device on the touch circuit, and may improve the signal quality of the touch circuit.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A touch device, comprising:
   a touch circuit, connected to a panel device and configured to generate a signal according to a touch on the panel device by an external object, wherein the touch circuit is configured to receive a reference signal provided by the panel device as a signal source of a ground terminal of the touch circuit;
   a power supply circuit, connected to the touch circuit, is configured to provide power for the touch circuit; and
   a host system, connected to the touch circuit, is configured to receive the signal generated by the touch circuit;
   wherein the touch circuit has a first working voltage, and the host system has a second working voltage, wherein when the first working voltage is higher than the second working voltage, the power supply circuit is configured to provide power for the touch circuit.

2. The touch device of claim 1, wherein the reference signal is generated by a common electrode layer of a sub-pixel of the panel device when the panel device is driven by a direct current or an alternate current.

3. The touch device of claim 1, wherein when the second working voltage is higher than the first working voltage, the host system is configured to provide power for the touch circuit.

4. The touch device of claim 1, wherein the power supply circuit further comprises a level shifter, wherein the level shifter is configured to convert a level of a communication signal between the touch circuit and the host system.

5. The touch device of claim 1, wherein the reference signal is a floating signal.

6. A touch display system, comprising:
   a panel device; and
   a touch device, comprising:
   a touch circuit, connected to the panel device and is configured to generate a signal according to a touch on the panel device by an external object, wherein the touch circuit is configured to receive a reference signal provided by the panel device as a signal source of a ground terminal of the touch circuit;
   a power supply circuit, connected to the touch circuit, is configured to provide power for the touch circuit; and
   a host system, connected to the touch circuit, is configured to receive the signal generated by the touch circuit;
   wherein the touch circuit has a first working voltage, and the host system has a second working voltage, wherein when the first working voltage is higher than the second working voltage, the power supply circuit is configured to provide power for the touch circuit.

7. The touch display system of claim 6, wherein the reference signal is generated by a common electrode layer of a sub-pixel of the panel device when the panel device is driven by a direct current or an alternate current.

8. The touch display system of claim 6, wherein when the second working voltage is higher than the first working voltage, the host system is configured to provide power for the touch circuit.

9. The touch display system of claim 6, wherein the power supply circuit further includes a level shifter configured to for convert a level of a communication signal between the touch circuit and the host system.

10. The touch display system of claim 6, wherein the reference signal is a floating signal.

* * * * *